United States Patent
Chen et al.

(10) Patent No.: US 12,464,571 B2
(45) Date of Patent: Nov. 4, 2025

(54) INFORMATION TRANSMISSION METHOD AND TERMINAL DEVICE

(71) Applicant: VIVO MOBILE COMMUNICATION CO., LTD., Guangdong (CN)

(72) Inventors: Xiaohang Chen, Dongguan (CN); Xiaodong Shen, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 1007 days.

(21) Appl. No.: 17/390,219

(22) Filed: Jul. 30, 2021

(65) Prior Publication Data

US 2021/0360708 A1   Nov. 18, 2021

Related U.S. Application Data

(63) Continuation of application No. PCT/CN2020/070905, filed on Jan. 8, 2020.

(30) Foreign Application Priority Data

Feb. 1, 2019 (CN) .......................... 201910105312.1

(51) Int. Cl.
*H04W 74/0833* (2024.01)
*H04W 72/0446* (2023.01)
(Continued)

(52) U.S. Cl.
CPC ... *H04W 74/0841* (2013.01); *H04W 72/0446* (2013.01); *H04W 72/21* (2023.01);
(Continued)

(58) Field of Classification Search
CPC ............. H04W 74/0841; H04W 72/21; H04W 72/0446; H04W 74/0816
(Continued)

(56) References Cited

U.S. PATENT DOCUMENTS 8,831,150 B1    9/2014 Xu et al.
2013/0301570 A1   11/2013 Xu et al.
(Continued)

FOREIGN PATENT DOCUMENTS

CN    101938701 A    1/2011
CN    102821474 A    12/2012
(Continued)

OTHER PUBLICATIONS

International Search Report and Written Opinion of the International Searching Authority regarding International Patent Application No. PCT/CN2020/070905, dated Mar. 26, 2020. Translation provided by Bohui Intellectual Property.
(Continued)

*Primary Examiner* — Chuck Huynh
(74) *Attorney, Agent, or Firm* — Harness, Dickey & Pierce, P.L.C.

(57) ABSTRACT

An information transmission method includes: if a PRACH transmission occasion is valid and a PUSCH transmission occasion associated with the PRACH transmission occasion is valid, transmitting a PRACH corresponding to a random access message on the PRACH transmission occasion, and transmitting a PUSCH corresponding to the random access message on the PUSCH transmission occasion.

15 Claims, 2 Drawing Sheets

If a PRACH transmission occasion is valid and a PUSCH transmission occasion associated with the PRACH transmission occasion is valid, transmitting a PRACH corresponding to a random access message on the PRACH transmission occasion, and transmitting a PUSCH corresponding to the random access message on the PUSCH transmission occasion — S110

(51) Int. Cl.
*H04W 72/21* (2023.01)
*H04W 74/0816* (2024.01)
*H04W 74/0836* (2024.01)

(52) U.S. Cl.
CPC ... *H04W 74/0816* (2013.01); *H04W 74/0833* (2013.01); *H04W 74/0836* (2024.01)

(58) Field of Classification Search
USPC .......................................................... 370/329
See application file for complete search history.

(56) References Cited

U.S. PATENT DOCUMENTS

| | | |
|---|---|---|
| 2018/0097590 A1 | 4/2018 | Ly et al. |
| 2018/0220450 A1 | 8/2018 | Aiba et al. |
| 2018/0270859 A1 | 9/2018 | Fan et al. |
| 2018/0368188 A1 | 12/2018 | Aiba et al. |
| 2020/0413426 A1* | 12/2020 | Park ................... H04L 5/0037 |
| 2021/0058971 A1* | 2/2021 | MolavianJazi ....... H04L 5/0044 |
| 2021/0068084 A1 | 3/2021 | Zhao |

FOREIGN PATENT DOCUMENTS

| | | |
|---|---|---|
| CN | 108513732 A | 9/2018 |
| CN | 109168147 A | 1/2019 |

OTHER PUBLICATIONS

"Remaining issues on group common PDCCH," LG Electronics, 3GPP TSG RAN WG1 #93, R1-1806617, dated May 25, 2018.

First Office Action regarding Chinese Patent Application No. 201910105312.1, dated Jun. 7, 2021. Translation provided by Bohui Intellectual Property.

"2-Step RACH Procedure," InterDigital, 3GPP TSG-RAN WG2 Meeting #103bis, R2-1814008, dated Oct. 12, 2018.

Supplementary European Search Report regarding Patent Application No. 20748528.5-1215/3920619; PCT/CN2020/070905, dated Feb. 23, 2022.

"On 2-step Random Access Procedure," Nokia et al., 3GPP TSG RAN WG1 Ad-Hoc Meeting 1901, R1-1901192, dated Jan. 25, 2019.

* cited by examiner

If a PRACH transmission occasion is valid and a PUSCH transmission occasion associated with the PRACH transmission occasion is valid, transmitting a PRACH corresponding to a random access message on the PRACH transmission occasion, and transmitting a PUSCH corresponding to the random access message on the PUSCH transmission occasion ~ S110

FIG. 1

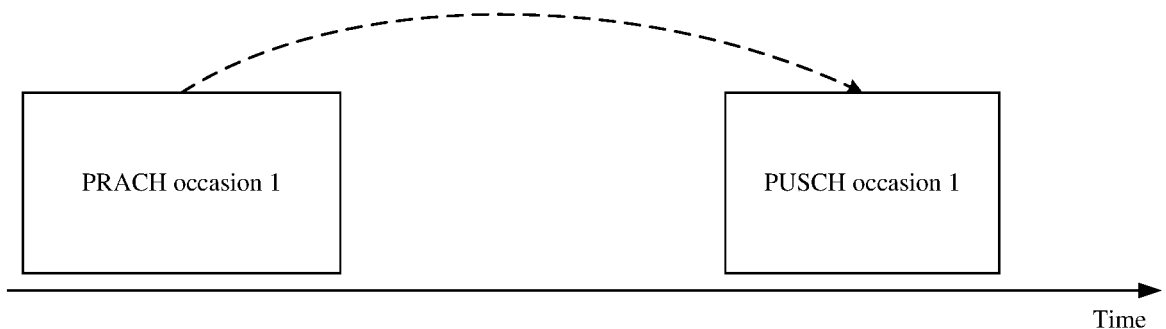

FIG. 2

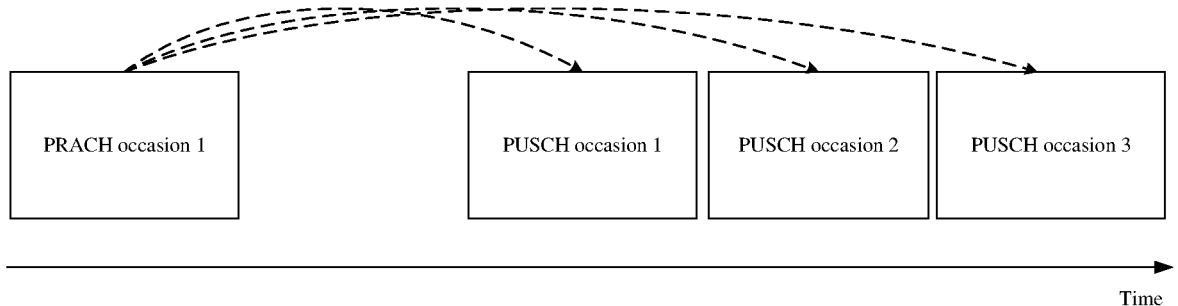

FIG. 3

If a PRACH transmission occasion is valid and a PUSCH transmission occasion associated with the PRACH transmission occasion is invalid, transmitting a PRACH corresponding to a random access message on the PRACH transmission occasion ~ S210

FIG. 4

INFORMATION TRANSMISSION METHOD AND TERMINAL DEVICE

CROSS-REFERENCE TO RELATED APPLICATIONS

The application is a Bypass Continuation Application of PCT/CN2020/070905, filed on Jan. 8, 2020, which claims priority to Chinese Patent 201910105312.1 filed on Feb. 1, 2019, which are incorporated herein by reference in their entirety.

TECHNICAL FIELD

The present disclosure relates to the technical field of communication, and more particularly, to an information transmission method and a terminal device.

BACKGROUND

In the previous mobile communication system, if the terminal device needs to transmit uplink data, it is necessary to acquire uplink timing synchronization through a random access process, that is, acquire uplink timing advance (TA) information from a network end. After uplink synchronization is acquired, the terminal device may transmit uplink data through dynamic scheduling or semi-static scheduling. Generally, the terminal device initiates a random access process including four processes to acquire the uplink timing synchronization.

SUMMARY

According to a first aspect, an information transmission method is provided and is applied to a terminal device. The method includes: if a physical random access channel (PRACH) transmission occasion is valid and a physical uplink shared channel (PUSCH) transmission occasion associated with the PRACH transmission occasion is valid, a PRACH corresponding to a random access message is transmitted on the PRACH transmission occasion, and a PUSCH corresponding to the random access message is transmitted on the PUSCH transmission occasion.

According to a second aspect, an information transmission method is provided and is applied to a terminal device. The method includes: if a PRACH transmission occasion is valid and a PUSCH transmission occasion associated with the PRACH transmission occasion is invalid, transmitting a PRACH corresponding to a random access message on the PRACH transmission occasion.

According to a third aspect, a terminal device is provided. The terminal device includes:
- a transceiver module, used to, if a PRACH transmission occasion is valid and a PUSCH transmission occasion associated with the PRACH transmission occasion is valid, transmit a PRACH corresponding to a random access message on the PRACH transmission occasion, and transmit a PUSCH corresponding to the random access message on the PUSCH transmission occasion.

According to a fourth aspect, a terminal device is provided. The terminal device includes:
- a transceiver module, used to, if a PRACH transmission occasion is valid and a PUSCH transmission occasion associated with the PRACH transmission occasion is invalid, transmit a PRACH corresponding to a random access message on the PRACH transmission occasion.

According to a fifth aspect, a terminal device is provided. The terminal device includes: a memory, a processor and a computer program which is stored in the memory and executable on the processor, where when the computer program is executed by the processor, steps of the information transmission method according to the first aspect are implemented.

According to a sixth aspect, a terminal device is provided. The terminal device includes: a memory, a processor and a computer program which is stored in the memory and executable on the processor, where when the computer program is executed by the processor, steps of the information transmission method according to the second aspect are implemented.

According to a seventh aspect, a non-transitory computer readable medium is provided. The non-transitory computer readable storage medium stores a computer program, where when the computer program is executed by the processor, steps of the information transmission method according to the first aspect are implemented.

According to an eighth aspect, a non-transitory computer readable storage medium is provided. The non-transitory computer readable storage medium stores a computer program, where when the computer program is executed by a processor, steps of the information transmission method as defined in the second aspect are implemented.

BRIEF DESCRIPTION OF THE DRAWINGS

The accompanying drawings are used to provide further understanding of the present disclosure and constitute a part of the present disclosure. The exemplary embodiments of the present disclosure and the description thereof serve to explain the present disclosure, but do not constitute an improper limitation to the present disclosure. In the accompanying drawings:

FIG. 1 is a schematic flowchart of an information transmission method according to an embodiment of the present disclosure.

FIG. 2 is a schematic diagram of an association relationship between a PRACH transmission occasion and a PUSCH transmission occasion according to an embodiment of the present disclosure.

FIG. 3 is a schematic diagram of an association relationship between a PRACH transmission occasion and a PUSCH transmission occasion according to an embodiment of the present disclosure.

FIG. 4 is a schematic flowchart of an information transmission method according to an embodiment of the present disclosure.

DETAILED DESCRIPTION OF EMBODIMENTS

Figure 5:
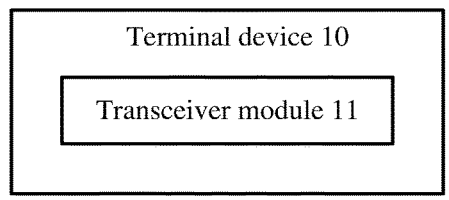
FIG. 5 is a structural schematic diagram of a terminal device according to an embodiment of the present disclosure.

The technical solutions in the embodiments of the present disclosure are described below clearly with reference to the accompanying drawings in the embodiments of the present disclosure. Apparently, the described embodiments are some rather than all of the embodiments of the present disclosure.

All other embodiments obtained by a person of ordinary skill in the art based on the embodiments of the present disclosure shall fall within the protection scope of the present disclosure.

It should be noted that in the specification and claims, "and/or" is used to indicate at least one of connected objects, for example, A and/or B and/or C indicates seven cases: only A, only B, only C, both A and B, both B and C, both A and C, and A, B and C.

The technical solution of the embodiments of the present disclosure may be applied to various communication systems, for example: a long terminal evolution (LTE)/long term evolution advanced (LTE-A) system, an LTE frequency division duplex (FDD) system, an LTE time division duplex (TDD) system, a 5G system, or a new radio (NR) system.

In the embodiments of the present disclosure, a terminal device (it can also be called user equipment (UE)), which may also be called a mobile terminal, mobile user equipment, etc., may communicate with one or more core networks through a radio access network (RAN). The user equipment may be a mobile terminal, such as a mobile phone (or called "cell" phone) and a computer with a mobile terminal, for example, it may be portable, pocket, handheld, computer in-built or vehicle-mounted mobile devices, which exchange language and/or data with the radio access network.

In the embodiments of the present disclosure, a network device is a device which is deployed in a wireless access network and used to provide a wireless communication function for the terminal device. The network, for example, may be a base station, where the base station may be an evolved node B (eNB or e-NodeB, evolutional Node B) and a 5G node B (gNB) in LTE.

The technical solutions in various embodiments of the present disclosure are described below in detail with reference to the accompanying drawings.

In the embodiments of the present disclosure, that the physical random access channel (PRACH) transmission occasion is valid may be understood that there is no conflict between a time domain resource where the PRACH occasion is and the downlink (DL) resource or DL transmission, and the terminal device may transmit the random access message on the valid PRACH transmission occasion.

In the embodiments of the present disclosure, that the PUSCH transmission occasion is valid may be understood that there is no conflict between the PUSCH occasion and the DL resource or DL transmission, and the terminal device may transmit PUSCH on the valid PUSCH occasion. That the PUSCH occasion is invalid may be understood that there is a conflict between the PUSCH occasion and the DL resource or DL transmission.

Compared with the previous mobile communication system, the future mobile communication system (for example, 5G) needs to adapt to more diverse scenes and service requirements. The main scene of a NR includes an enhanced mobile broadband (eMBB), massive machine type communication (mMTC) and ultra reliable & low latency communication (URLLC). These scenes require high reliability, low latency, large bandwidth and wide coverage. In these scenes, if the uplink data packet is small, the way of transmitting uplink data after acquiring uplink synchronization through the random access process will cause consumption of resources and electric quantity; therefore, the terminal device may also transmit the uplink data in an asynchronous state. That is, the terminal device may initiate the random access process including two steps to transmit data in the asynchronous state and acquire uplink timing synchronization.

When initiating the random access process including two steps, the terminal device will transmit PRACH and PUSCH. In a time division duplexing mode, for a certain transmission time, the transmission direction is determined according to TDD configuration information. If the time when the terminal device initiates the random access process including two steps to transmit PRACH and PUSCH is the downlink transmission time configured by the TDD configuration information (or it may be understood that the resources for transmitting the PRACH and the PUSCH conflict with the configured downlink transmission resource), it will bring interference to the downlink transmission of the network device.

FIG. 1 shows an information transmission method according to an embodiment of the present disclosure. The method in FIG. 1 may be performed by the terminal device. As shown in FIG. 1, the method includes:

S110: if a physical random access channel (PRACH) transmission occasion is valid and a physical uplink shared channel (PUSCH) transmission occasion associated with the PRACH transmission occasion is valid, a PRACH corresponding to a random access message is transmitted on the PRACH transmission occasion, and a PUSCH corresponding to the random access message is transmitted on the PUSCH transmission occasion.

It should be noted that in S110, that if the PRACH transmission occasion is valid and the PUSCH transmission occasion associated with the PRACH transmission occasion is valid, the PRACH corresponding to the random access message is transmitted on the PRACH transmission occasion, and the PUSCH corresponding to the random access message is transmitted on the PUSCH transmission occasion may be understood that if the PRACH transmission occasion is valid and the PUSCH transmission occasion associated with the PRACH transmission occasion is valid, the random access message is transmitted, where the random access message is carried on the PRACH and the PUSCH.

Optionally, in some embodiments, the random access message in S110 is an msg A in a 2-step random access process, and the terminal device may transmit the msg A to the network device when initiating RACH transmission to the network device in the 2-step random access process. In this case, the msg A corresponds to the PRACH and the PUSCH. Subsequently, for the convenience of description, the PRACH corresponding to the msg A is described as msg A PRACH, and the PUSCH corresponding to the msg A is described as msg A PUSCH.

That random access message (msg A) transmitted by the terminal device corresponds to the PRACH and the PUSCH in the 2-step random access step may also be understood that the random access message is carried on the PRACH and the PUSCH. In the case that the random access message corresponds to the PRACH and the PUSCH, one part of content corresponding to the random access message, such as a preamble, may be transmitted through the PRACH; and the other part of content corresponding to the random access message, such as a terminal device identifier or a cell radio network temporary identifier (C-RNTI), may be transmitted by the PUSCH.

Optionally, in S110, there may be one or more PUSCH transmission occasions associated with one PRACH transmission occasion. In other words, an association relationship between the PRACH transmission occasion and the PUSCH transmission occasion may be one of a one-to-one association relationship, a one-to-many association relationship and many-to-many association relationship.

For example, as shown in FIG. 2, there is a one-to-one association relationship between the PRACH occasion 1 and the PUSCH occasion 1. Or, as shown in FIG. 3, there is a one-to-many association relationship among the PRACH occasion 1, the PUSCH occasion 1, the PUSCH occasion 2 and the PUSCH occasion 3.

Optionally, in some embodiments, in S110, there are a plurality of PUSCH transmission occasions. Correspondingly, in S110, that the PUSCH corresponding to the random access message is transmitted on the PUSCH transmission occasion includes: the PUSCH corresponding to the random access message is transmitted on a target PUSCH transmission occasion in the PUSCH transmission occasion.

Optionally, in some embodiments, the target PUSCH transmission occasion may be any one PUSCH transmission occasion in a plurality of PUSCH transmission occasions.

Optionally, in some other embodiments, a time interval between the target PUSCH transmission occasion and the PRACH transmission occasion is a target time interval, and the target time interval is less than or equal to a time interval between other PUSCH transmission occasions in the PUSCH transmission occasions and the PRACH transmission occasion.

In other words, if at least two PUSCH occasions in the plurality of PUSCH occasions associated with the PRACH occasion are valid, the terminal device may select at least one PUSCH occasion in at least two PUSCH occasions to transmit a PUSCH (for example, msg A PUSCH) corresponding to a random access message. Or, optionally, the terminal device may select a PUSCH occasion closest to the PRACH occasion in a time domain to transmit a PUSCH (for example, msg A PUSCH) corresponding to the random access message.

For example, as shown in FIG. 3, the PRACH occasion 1 is valid, the PUSCH occasion 1 is not valid, and the PUSCH occasion 2 and the PUSCH occasion 3 are valid. The terminal device may initiate transmission of the PRACH (for example, msg A PRACH) corresponding to the random access message on the PRACH occasion 1, and transmit the PRACH (for example, msg A PRACH) corresponding to the random access message on any one of the PUSCH occasion 2 and the PUSCH occasion 3. Or, optionally, the terminal device may transmit the PRACH (for example, msg A PRACH) corresponding to the random access message in the PUSCH occasion 2.

Optionally, in some other embodiments, the terminal device works on an unlicensed frequency band, and a time interval between the PRACH transmission occasion and the target PUSCH transmission occasion is less than or equal to a preset time interval. That is, if, for one PRACH occasion, there is a time interval between the PUSCH occasion associated with the PRACH occasion and the PRACH occasion and the time interval is less than or equal to a certain preset value, the terminal device initiates msg A transmission.

Optionally y, in some other embodiments, the terminal device works on an unlicensed frequency band, and a total duration of the PRACH transmission occasion and the target PUSCH transmission occasion is less than or equal to a preset duration. That is, if, for one PRACH occasion, the total duration of the PUSCH occasion associated with the PRACH occasion and the PRACH occasion is less than or equal to a certain preset value, the terminal device initiates msg A transmission.

Optionally, when the terminal device works on an unlicensed frequency band, it is necessary to do listen before talk (LBT) before a message is transmitted, that is, clear channel assess (CCA) or extended clear channel assess (eCCA) to listen a channel, that is, perform energy detection (ED). When the energy is less than a certain threshold, the channel is judged to be empty, and transmission may be started.

The terminal device may adopt the following three LBT categories: LBT category 1: direction transmission without any CAA, which must be used when the channel has been acquired and the transmission conversion interval is less than 16 us. LBT category 2: 25 us channel listening, which may be used when the channel is acquired for a specific signal and the maximum continuous transmission length should be less than a certain value, for example, 1 ms. LBT category 3: channel listening with fusion random back-off, where different parameters are set for different priorities, and the maximum transmission lengths after the channel is acquired finally are different. It may be seen that different LBT categories correspond to different maximum continuous transmission lengths, so the preset duration is relevant to the LBT category adopted by the terminal device.

Based on all the above embodiments, if in S110, the PRACH transmission occasion is valid and the PUSCH transmission occasion is invalid, the PRACH transmission occasion is abandoned to transmit the PRACH corresponding to the random access message. That is, if one PRACH transmission occasion does not have a PUSCH transmission occasion associated with the PRACH transmission occasion, the terminal device does not initiate msg A transmission on the PRACH transmission occasion.

Optionally, in the case that the PRACH transmission occasion is valid and the PUSCH transmission occasion is invalid, the terminal device may abandon the PUSCH transmission occasion, or the terminal device may not transmit the PUSCH (for example, msg A PUSCH) corresponding to the random access message.

For example, as shown in FIG. 2, the PRACH occasion 1 is valid, the PUSCH occasion 1 is not valid, and the terminal device does not initiate msg A transmission on the PRACH occasion 1, that is, the terminal device does not transmit msg A PRACH on the PRACH occasion 1 and does not transmit msg A PUSCH on the PUSCH occasion 1.

FIG. 4 is a schematic flowchart of an information transmission method according to another embodiment of the present disclosure. The method in FIG. 4 may be performed by the terminal device. As shown in FIG. 4, the method includes:

S210: if a PRACH transmission occasion is valid and a PUSCH transmission occasion associated with the PRACH transmission occasion is invalid, a PRACH corresponding to a random access message is transmitted on the PRACH transmission occasion.

Therefore, according to the method shown in FIG. 4, the terminal device only transmits the PRACH corresponding to the random access message on the PRACH transmission occasion in the case that the PARCH transmission occasion is valid and the PUSCH transmission occasion associated with the PRACH transmission occasion is invalid. Therefore, interference to the downlink transmission caused by PUSCH transmission on the invalid PUSCH may be avoided.

Optionally, in some embodiments, in S210, the random access message is msg 1 in a 4-step random access process, where the msg 1 only carries PRACH, or the msg 1 only includes a PRACH preamble. For example, as shown in FIG.

2, the PRACH occasion 1 is valid, the PUSCH occasion 1 is not valid, and the terminal device may initiate msg 1 transmission on the PRACH occasion 1, that is, the terminal device transmits msg 1 on the PRACH occasion 1.

The PRACH preamble of the msg 1 and the PRACH preamble of the msg A in the method shown in FIG. 1 may be independent. For example, a network device may configure the PRACH preamble of the msg A and the PRACH preamble of the msg 1 in advance, and the terminal device selects one PRACH preamble from the PRACH preamble of the configured msg 1 as msg 1 to transmit.

The PRACH preamble of the msg 1 and the PRACH preamble of the msg A in the method shown in FIG. 1 may be non-independent. For example, the network device may configure a PRACH preamble set shared by the PRACH preamble of the msg 1 and the PRACH preamble of the msg A in advance, and the terminal device selects one PRACH preamble from the configured PRACH preamble set as the msg 1 to transmit.

Optionally, in S210, there may be one or more PUSCH transmission occasions associated with one PRACH transmission occasion. In other words, an association relationship between the PRACH transmission occasion and the PUSCH transmission occasion may be one of a one-to-one association relationship, a one-to-many association relationship and many-to-many association relationship.

For example, as shown in FIG. 2, there is a one-to-one association relationship between the PRACH occasion 1 and the PUSCH occasion 1. Or, as shown in FIG. 3, there is a one-to-many association relationship among the PRACH occasion 1, the PUSCH occasion 1, the PUSCH occasion 2 and the PUSCH occasion 3.

Optionally, in some embodiments, the terminal device works on an unlicensed frequency band. That the PRACH corresponding to the random access message is transmitted on the PRACH transmission occasion in S210 includes: if a time interval between the PRACH transmission occasion and the PUSCH transmission occasion is greater than or equal to a preset time interval, the PRACH corresponding to the random access message is transmitted on the PRACH transmission occasion. That is, if, for one valid PRACH occasion, the PUSCH occasion associated with the PRACH occasion is invalid, there is a time interval between the PUSCH occasion and the PRACH occasion and the time interval is greater than a certain preset value, the terminal device transmits msg 1 on the PRACH occasion.

Optionally, in some embodiments, the terminal device works on an unlicensed frequency band. That the PRACH corresponding to the random access message is transmitted on the PRACH transmission occasion in S210 includes: if a total duration of the PRACH transmission occasion and the PUSCH transmission occasion is greater than or equal to a preset duration, the PRACH corresponding to the random access message is transmitted on the PRACH transmission occasion. That is, if, for one valid PRACH occasion, the PUSCH occasion associated with the PRACH occasion is invalid and the total duration of the PUSCH occasion and the PRACH occasion is greater than a certain preset value, the terminal device transmits msg 1 on the PRACH occasion.

Optionally, when the terminal device works on an unlicensed frequency band, it is necessary to do LBT before a message is transmitted, that is, CCA or eCCA to listen a channel, that is, perform ED. When the energy is less than a certain threshold, the channel is judged to be empty, and transmission may be started.

The terminal device may adopt the following three LBT categories: LBT category 1: direction transmission without any CAA, which must be used when the channel has been acquired and the transmission conversion interval is less than 16 us. LBT category 2: 25 us channel listening, which may be used when the channel is acquired for a specific signal and the maximum continuous transmission length should be less than a certain value, for example, 1 ms. LBT category 3: channel listening with fusion random back-off, where different parameters are set for different priorities, and the maximum transmission lengths after the channel is acquired finally are different. It may be seen that different LBT categories correspond to different maximum continuous transmission lengths, so the preset duration is relevant to the LBT category adopted by the terminal device.

Based on all the above embodiments, if the terminal device is configured that the 2-step random access process or the 4-step random access process may be performed, the terminal device may perform the 2-step random access process and transmit the msg A of the 2-step random access process in the case that the PRACH transmission occasion is valid and the PUSCH transmission occasion associated with the PRACH transmission occasion is valid, that is, the PRACH corresponding to the msg A is transmitted on the PRACH transmission occasion, and the PUSCH corresponding to the msg A is transmitted on the PUSCH transmission occasion; or the terminal device may perform the 4-step random access process and transmit the msg 1 of the 4-step random access process in the case that the PRACH transmission occasion is valid and the PUSCH transmission occasion associated with the PRACH transmission occasion is invalid, that is, the PRACH corresponding to the msg 1 is transmitted on the PRACH transmission occasion.

The information transmission method according to the embodiments of the present disclosure is described above in detail with reference to FIG. 1 to FIG. 4, and the terminal device according to the embodiments of the present disclosure is described below in detail with reference to FIG. 5.

FIG. 5 is a structural schematic diagram of a terminal device according to an embodiment of the present disclosure. As shown in FIG. 5, the terminal device 10 includes:

a transceiver module 11, used to, if a PRACH transmission occasion is valid and a PUSCH transmission occasion associated with the PRACH transmission occasion is valid, transmit a PRACH corresponding to a random access message on the PRACH transmission occasion, and transmit a PUSCH corresponding to the random access message on the PUSCH transmission occasion.

Optionally, as an embodiment, the transceiver module 11 is further used to:

if the PRACH transmission occasion is valid and the PUSCH transmission occasion is invalid, abandon using the PRACH transmission occasion to transmit the PRACH corresponding to the random access message.

Optionally, as an embodiment, there are a plurality of PUSCH transmission occasions; and the transceiver module 11 may be used to: transmit the PUSCH corresponding to the random access message on a target PUSCH transmission occasion in the PUSCH transmission occasions.

Optionally, as an embodiment, a time interval between the target PUSCH transmission occasion and the PRACH transmission occasion is a target time interval, and the target time interval is less than or equal to a time interval between other PUSCH transmission occasions in the PUSCH transmission occasions and the PRACH transmission occasion.

Optionally, as an embodiment, the terminal device works on an unlicensed frequency band, and a time interval between the PRACH transmission occasion and the target PUSCH transmission occasion is less than or equal to a preset time interval.

Optionally, as an embodiment, the terminal device works on an unlicensed frequency band, and a total duration of the PRACH transmission occasion and the target PUSCH transmission occasion is less than or equal to a preset duration.

Optionally, as an embodiment, the preset duration is relevant to the LBT category adopted by the terminal device.

The terminal device provided by the embodiment of the present disclosure can realize each process of implementing the terminal device in the embodiment of the method in FIG. 1, which is not elaborated here to avoid repetition.

Figure 6:
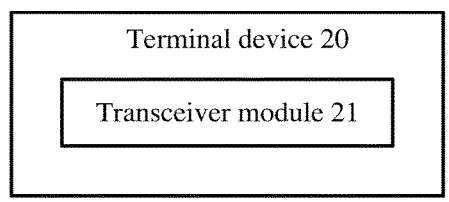
FIG. 6 is a structural schematic diagram of a terminal device according to another embodiment of the present disclosure.

FIG. 6 is a structural schematic diagram of a terminal device according to another embodiment of the present disclosure. As shown in FIG. 6, the terminal device 20 includes:

a transceiver module 21, used to, if a PRACH transmission occasion is valid and a PUSCH transmission occasion associated with the PRACH transmission occasion is invalid, transmit a PRACH corresponding to a random access message on the PRACH transmission occasion.

Optionally, as an embodiment, the terminal device works on an unlicensed frequency band; and the transceiver module 21 may be used to:

if a time interval between the PRACH transmission occasion and the PUSCH transmission occasion is greater than or equal to a preset time interval, transmit the PRACH corresponding to the random access message on the PRACH transmission occasion.

Optionally, as an embodiment, the terminal device works on an unlicensed frequency band; and the transceiver module 21 may be used to:

if a total duration occupied by the PRACH transmission occasion and the PUSCH transmission occasion is greater than or equal to a preset duration, transmit the PRACH corresponding to the random access message on the PRACH transmission occasion.

Optionally, as an embodiment, the preset duration is relevant to the LBT category adopted by the terminal device.

The terminal device provided by the embodiment of the present disclosure can realize each process of implementing the terminal device in the embodiment of the method in FIG. 4, which is not elaborated here to avoid repetition.

Figure 7:
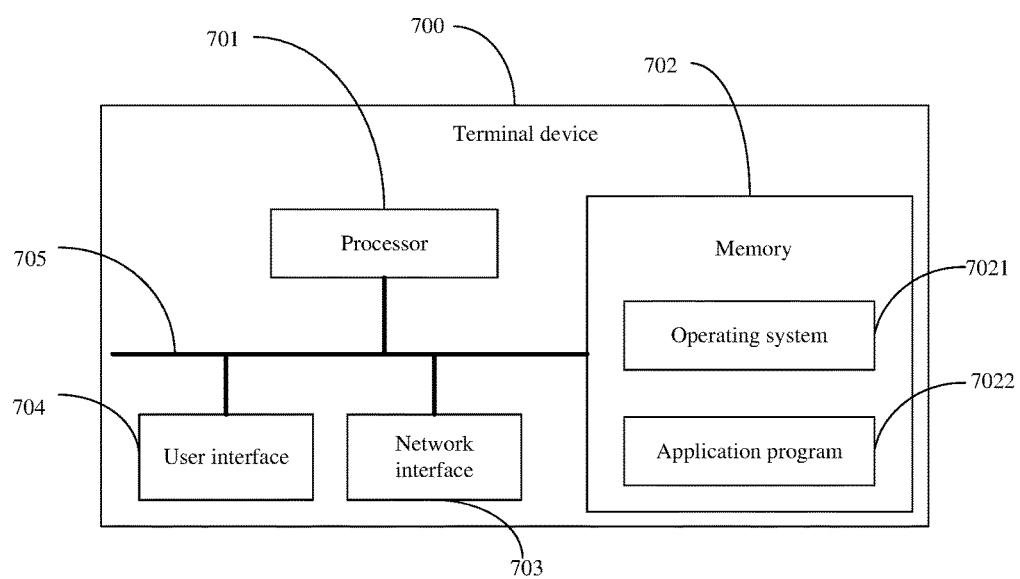
FIG. 7 is a structural schematic diagram of a terminal device according to yet another embodiment of the present disclosure.

FIG. 7 is a block diagram of a terminal device according to another embodiment of the present disclosure. As shown in FIG. 7, the terminal device 700 includes at least one processor 701, a memory 702, a user interface 703, and at least one network interface 704. The components in the terminal device 700 are coupled together through a bus system 705. It may be understood that the bus system 705 is used to implement connection and communication between these components. In addition to a data bus, the bus system 705 also includes a power bus, a control bus, and a status signal bus. However, for clarity of description, various buses are marked as the bus system 705 in FIG. 5.

The user interface 703 may include a display, a keyboard, or a clicking device (for example, a mouse, a trackball), a touch panel, or a touchscreen.

It may be understood that the memory 702 in this embodiment of the present disclosure may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM), and a direct rambus random access memory (DRRAM). The memory 702 of the system and the method described in the embodiments of the present disclosure is intended to include, but is not limited to, these and any other suitable types of memories.

In some implementation manners, the memory 702 stores the following elements: executable modules or data structures, a subset thereof, or an extended set thereof: an operating system 7021 and an application program 7022.

The operating system 7021 includes various system programs, for example, a framework layer, a kernel library layer, and a driver layer, and is used to implement various basic services and process hardware-based tasks. The application program 7022 includes various application programs, for example, a media player and a browser, and is used to implement various application services. A program for implementing the method in the embodiments of the present disclosure may be included in the application 7022.

In the embodiments of the present disclosure, the terminal device 700 further includes: a computer program which is stored on a memory 702 and capable of operating on a processor 701, where the computer program, when being executed by a processor 701, enables the processor to implement each process of the method in FIG. 1 and FIG. 2. The same technical effect can be achieved. In order to avoid repetition, details are not described herein again.

The method disclosed in the embodiments of the present disclosure may be applied to the processor 701 or implemented by the processor 701. The processor 701 may be an integrated circuit chip having a signal processing capability. During implementation, the steps of the foregoing method may be completed by hardware integrated logic circuits in the processor 701 or instructions in a form of software. The processor 701 may be a general-purpose processor, a digital signal processor (DSP), an application specific integrated circuit (ASIC), a field programmable gate array (FPGA) or other programmable logic devices, a discrete gate or a transistor logic device and a discrete hardware component. The processor may implement or perform the methods, the steps, and logical block diagrams that are disclosed in the embodiments of the present disclosure. The general-purpose processor may be a microprocessor or may be any conventional processor or the like. The steps of the method disclosed in the embodiments of the present disclosure may be directly executed by a hardware decoding processor or by a combination of hardware and software modules in the decoding processor. The software module may be located in a mature non-transitory computer readable storage medium in this field such as a random access memory, a flash memory, a read-only memory, a programmable read-only memory or an electrically erasable programmable memory, or a register. The non-transitory computer readable storage medium is located in the memory 702, and the processor 701 reads information from the memory 702 and completes the steps of the foregoing method in combination with hardware of the processor. Specifically, the non-transitory computer readable storage medium stores a computer program, and when the computer program is executed by the processor 701, the steps of the method embodiments shown in FIG. 1 to FIG. 4 are implemented.

It may be understood that the embodiments described in the embodiments of the present disclosure may be implemented by hardware, software, firmware, middleware, microcode, or a combination thereof. For implementation with hardware, the processing module may be implemented in one or more application specific integrated circuits (ASIC), a digital signal processor (DSP), a digital signal processing device (DSPD), a programmable logic device (PLD), a field-programmable gate array (FPGA), a general-purpose processor, a controller, a microcontroller, a microprocessor, another electronic unit for implementing the functions of the present disclosure, or a combination thereof.

For implementation with software, technologies described in the embodiments of the present disclosure may be implemented by executing functional modules (for example, a process and a function) in the embodiments of the present disclosure. Software code may be stored in a memory and executed by a processor. The memory may be implemented in the processor or outside the processor.

The embodiments of the present disclosure further provide a non-transitory computer readable storage medium. The non-transitory computer readable storage medium stores a computer program, and when a processor executes the computer program, the processes of the foregoing method embodiment are implemented and the same technical effect can be achieved. To avoid repetition, details are not described herein again. The non-transitory computer readable storage medium may be a read-only memory (ROM), a random access memory (RAM), a magnetic disk, a compact disc, or the like.

It should be noted that in this specification, the terms "comprise", "include", and any other variants thereof are intended to cover non-exclusive inclusion, so that a process, a method, an article, or an apparatus that includes a series of elements not only includes these very elements, but also includes other elements not expressly listed, or also includes elements inherent to this process, method, article, or apparatus. Without being subject to further limitations, an element defined by a phrase "including a . . . " does not exclude presence of other identical elements in the process, method, article, or apparatus that includes the very element.

According to the foregoing descriptions of the implementations, a person skilled in the art may clearly understand that the foregoing methods in the embodiments may be implemented by using software and a required universal hardware platform, or certainly may be implemented by using hardware. However, in many cases, the former is a better implementation. Based on such an understanding, the technical solutions of the present disclosure essentially or the part contributing to the prior art may be implemented in a form of a software product. The computer software product is stored in a storage medium (such as a ROM/RAM, a magnetic disk, or an optical disc), and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings, but the present disclosure is not limited to the foregoing specific implementations. The foregoing specific implementations are merely schematic instead of restrictive. Under enlightenment of the present disclosure, a person of ordinary skills in the art may make many forms without departing from the aims of the present disclosure and the protection scope of claims, all of which fall within the protection of the present disclosure.

What is claimed is:

1. An information transmission method, applied to a terminal device, comprising:
   in a 2-step random access process, when a physical random access channel (PRACH) transmission occasion is valid and there is no valid physical uplink shared channel (PUSCH) transmission occasion associated with the PRACH transmission occasion, transmitting a PRACH corresponding to a random access message on the PRACH transmission occasion, and abandoning transmission for a PUSCH corresponding to the random access message;
   wherein the PRACH transmission occasion is valid when there is no conflict between a time domain resource where the PRACH transmission occasion is and downlink (DL) resource or DL transmission.

2. The method according to claim 1, wherein the terminal device works on an unlicensed frequency band; and
   the transmitting the PRACH corresponding to the random access message on the PRACH transmission occasion comprises:
   if a time interval between the PRACH transmission occasion and the PUSCH transmission occasion is greater than or equal to a preset time interval, transmitting the PRACH corresponding to the random access message on the PRACH transmission occasion.

3. The method according to claim 1, wherein the terminal device works on an unlicensed frequency band; and
   the transmitting the PRACH corresponding to the random access message on the PRACH transmission occasion comprises:
   if a total duration occupied by the PRACH transmission occasion and the PUSCH transmission occasion is greater than or equal to a preset duration, transmitting the PRACH corresponding to the random access message on the PRACH transmission occasion.

4. The method according to claim 3, wherein
   the preset duration is relevant to a listen before talk (LBT) category used by the terminal device.

5. The method according to claim 1, wherein the random access message is an msg A in the 2-step random access process.

6. A terminal device, comprising: a memory, a processor and a computer program which is stored in the memory and executable on the processor, wherein the computer program, when executed by the processor, causes the terminal device to perform:
   in a 2-step random access process, when a physical random access channel (PRACH) transmission occasion is valid and there is no valid physical uplink shared channel (PUSCH) transmission occasion associated with the PRACH transmission occasion, transmitting a PRACH corresponding to a random access message on the PRACH transmission occasion, and abandoning transmission for a PUSCH corresponding to the random access message;
   wherein the PRACH transmission occasion is valid when there is no conflict between a time domain resource where the PRACH transmission occasion is and downlink (DL) resource or DL transmission.

7. The terminal device according to claim 6, wherein the terminal device works on an unlicensed frequency band; and
   the computer program, when executed by the processor, causes the terminal device to perform:

if a time interval between the PRACH transmission occasion and the PUSCH transmission occasion is greater than or equal to a preset time interval, transmitting the PRACH corresponding to the random access message on the PRACH transmission occasion.

8. The terminal device according to claim 6, wherein the terminal device works on an unlicensed frequency band; and
the computer program, when executed by the processor, causes the terminal device to perform:
if a total duration occupied by the PRACH transmission occasion and the PUSCH transmission occasion is greater than or equal to a preset duration, transmitting the PRACH corresponding to the random access message on the PRACH transmission occasion.

9. The terminal device according to claim 8, wherein the preset duration is relevant to a listen before talk (LBT) category used by the terminal device.

10. The terminal device according to claim 6, wherein the random access message is an msg A in the 2-step random access process.

11. A non-transitory computer readable medium, storing a computer program, wherein the computer program, when executed by a processor of a terminal device, causes the processor of the terminal device to perform:
in a 2-step random access process, when a physical random access channel (PRACH) transmission occasion is valid and there is no valid physical uplink shared channel (PUSCH) transmission occasion associated with the PRACH transmission occasion, transmitting a PRACH corresponding to a random access message on the PRACH transmission occasion, and abandoning transmission for a PUSCH corresponding to the random access message;
wherein the PRACH transmission occasion is valid when there is no conflict between a time domain resource where the PRACH transmission occasion is and downlink (DL) resource or DL transmission.

12. The non-transitory computer readable medium according to claim 11, wherein:
the terminal device works on an unlicensed frequency band; and
the computer program, when executed by the processor of the terminal device, causes the processor of the terminal device to perform:
if a time interval between the PRACH transmission occasion and the PUSCH transmission occasion is greater than or equal to a preset time interval, transmitting the PRACH corresponding to the random access message on the PRACH transmission occasion.

13. The non-transitory computer readable medium according to claim 11, wherein:
the terminal device works on an unlicensed frequency band; and
the computer program, when executed by the processor of the terminal device, causes the processor of the terminal device to perform:
if a total duration occupied by the PRACH transmission occasion and the PUSCH transmission occasion is greater than or equal to a preset duration, transmitting the PRACH corresponding to the random access message on the PRACH transmission occasion.

14. The non-transitory computer readable medium according to claim 13, wherein the preset duration is relevant to a listen before talk (LBT) category used by the terminal device.

15. The non-transitory computer readable medium according to claim 11, wherein the random access message is an msg A in the 2-step random access process.

* * * * *